US006768911B2

(12) United States Patent
Hino et al.

(10) Patent No.: US 6,768,911 B2
(45) Date of Patent: Jul. 27, 2004

(54) COMMUNICATION TERMINAL DEVICE (75) Inventors: Ichiro Hino, Tokyo (JP); Katsumi Koshimura, Tokyo (JP)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 09/789,159

(22) Filed: Feb. 20, 2001

(65) Prior Publication Data

US 2001/0018351 A1 Aug. 30, 2001

(30) Foreign Application Priority Data

Feb. 22, 2000 (JP) ...................................... P2000-044509

(51) Int. Cl.[7] ................................................ H04B 1/38
(52) U.S. Cl. ............................ 455/552.1; 455/556.1; 455/557; 455/569; 379/433.1
(58) Field of Search ............................ 455/552.1, 566, 455/555, 556.1, 556.2; 370/352, 260, 261, 262–263; 379/433.13

(56) References Cited

U.S. PATENT DOCUMENTS

| 5,628,055 A | * | 5/1997 | Stein ........................ 455/575.1 |
| 5,983,073 A | * | 11/1999 | Ditzik ........................ 455/11.1 |
| 6,085,112 A | * | 7/2000 | Kleinschmidt et al. .. 455/556.1 |
| 6,237,027 B1 | * | 5/2001 | Namekawa .................. 709/206 |
| 6,253,093 B1 | * | 6/2001 | Yoshikawa .................. 455/557 |
| 6,272,359 B1 | * | 8/2001 | Kivela et al. ................ 455/567 |
| 6,442,375 B1 | * | 8/2002 | Parmentier .................... 455/78 |
| 6,487,396 B1 | * | 11/2002 | Sassi ........................ 455/90.1 |
| 6,549,789 B1 | * | 4/2003 | Kfoury ...................... 455/550.1 |
| 6,577,622 B1 | * | 6/2003 | Schuster et al. ............. 370/352 |

FOREIGN PATENT DOCUMENTS

| EP | 94406507 | 2/1994 |
| WO | 98/39941 | 9/1998 |

* cited by examiner

Primary Examiner—William Trost
Assistant Examiner—Joe Nguyen
(74) Attorney, Agent, or Firm—Jay H. Maioli

(57) ABSTRACT

A communication terminal device is miniaturized in a shape handy to carry while maintaining the necessary operability. The terminal device is constituted by a first box for voice communication and a second box linked with the first box via short-distance radio link for data input and data display. The first box is provided with minimum functions necessary for the voice communication so as to be small, whereas the second box can be provided with a keyboard high in operability and a relatively large display means so that display and input for data communication can be made conveniently.

7 Claims, 10 Drawing Sheets

COMMUNICATION TERMINAL DEVICE

BACKGROUND OF THE INVENTION

Field of the Invention

The present invention relates to a communication terminal device suitably applied for example to a wireless telephone device called a portable telephone terminal.

Description of the Related Art

A variety of mobile telephone terminals used as a wireless telephone device have been practically used. These conventional portable telephone terminals comprises a box including a microphone and a speaker for voice communication, a key input portion for inputting a telephone number, a function command and so on, and a display portion for displaying the telephone number and so on. This basic constitution is common in all of the terminals.

Basically, the portable telephone terminal has to be made small so that the user can always carry and transmit and/or receive information at any place. However, if each of the components described above is to be disposed within a single box, there is a limit in the size and shape as the terminal.

Further, recently, some portable telephone terminals are capable of not only making voice communication but also making data transmission including such data as character data and image data. In such a terminal capable of performing these functions, a relatively large display portion has to be disposed as the display portion, thus leading to a problem of increased size of the terminal.

Further, when inputting a character message, a common method used at present is that the inputting of characters is made by using dialing keys and so on. However, inputting the characters by using such a limited number of keys poses a problem of low operability.

The present invention is made for the situation described above, and it is therefore an object of the present invention to make it possible that the communication terminal device is miniaturized in a shape for good portability while maintaining the operability necessary for the communication terminal device.

SUMMARY OF THE INVENTION

The present invention provides a communication terminal device comprising: first housing 100 including; first radio communication means for radio communication with a predetermined station or another terminal, first data processing means for processing of data to be transmitted or received by the first radio communication means, second radio communication means connected with the first data processing means for short-distance radio communication, and voice communication means connected with the first data processing means for processing for voice communication; and a second housing including; third radio communication means for short-distance radio communication with the second radio communication means in the first housing, second data processing means connected with the third radio communication means for processing of data to be transmitted or received, input means for inputting data to the second data processing means, and display means for displaying data processed by the second data processing means.

According to the above described invention, voice communication can be made by using the communication means provided in the first housing. For data transmission in which a character message, image data and so on are transmitted, received data can be displayed in the display means provided in the second housing whereas inputting operation of the necessary data can be performed by using the inputting means provided in the second housing.

DESCRIPTION OF THE PREFERRED EMBODIMENTS

Hereinafter, a first embodiment of the present invention will be described with reference to FIGS. 1 to 7.

In the present embodiment, the present invention is applicable to a wireless telephone device (portable telephone terminal) in which voice communication and data transmission are performed by wirelessly exchanging digital data of a predetermined format with a station for example. According to the present embodiment, a set of terminal device is constituted by a pair of housings, namely portable telephone terminal 100 for performing radio communication with the station (or another authorized terminal device of the same kind), and data inputting/outputting device 200 for performing data inputting and outputting operation.

Figure 1:
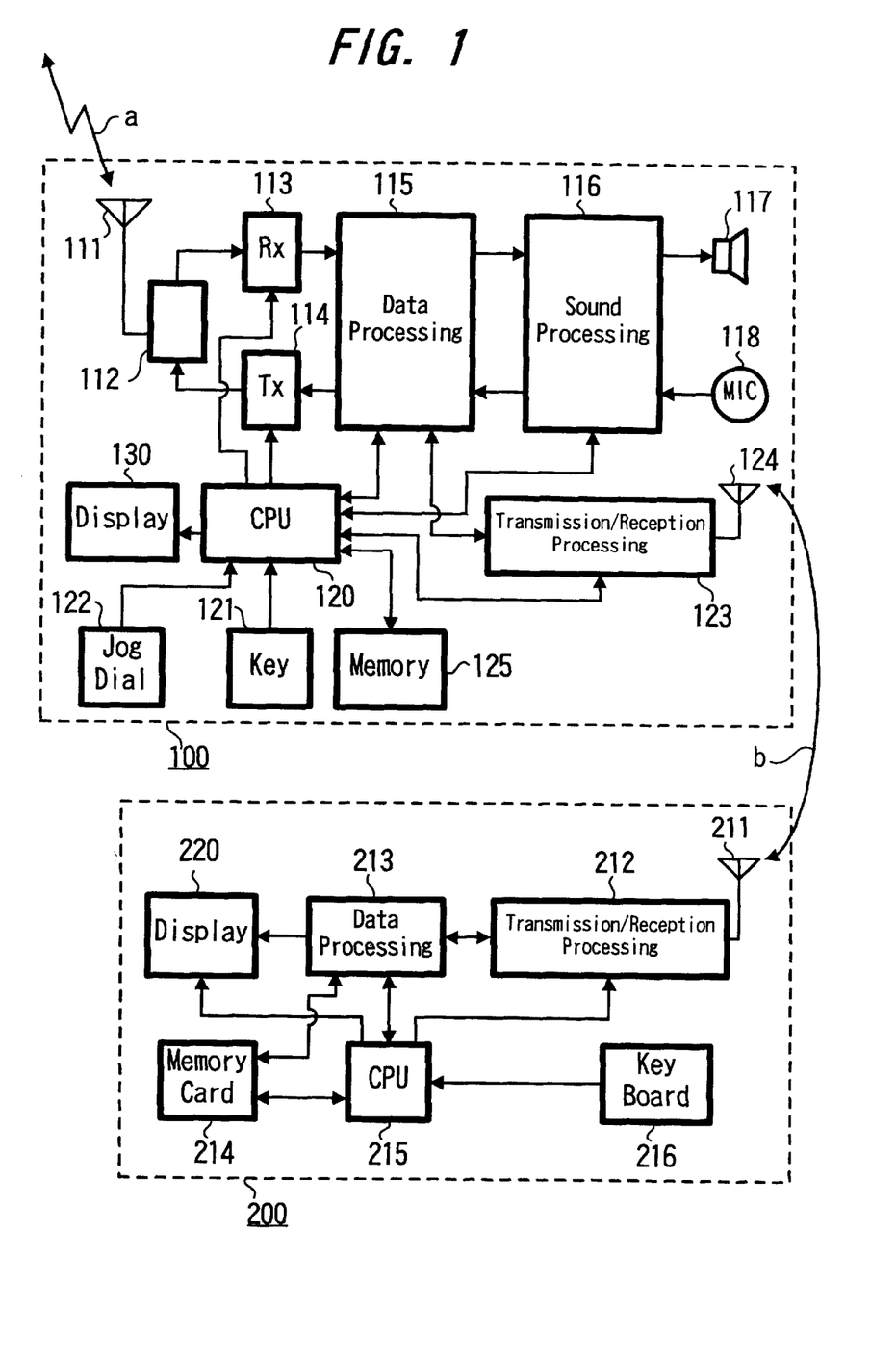
FIG. 1 is a block diagram showing a constitution according to a first embodiment of the present invention.

FIG. 1 is a block diagram showing the constitution of portable telephone terminal 100 and data inputting/outputting device 200 as the components of the terminal device according to the present embodiment. First, the constitution of portable telephone terminal 100 will be described. Portable telephone terminal 100 includes antenna 111 for performing radio communication "a" with the station for a wireless telephone. Antenna 111 is connected with receiving circuit 113 and transmitting circuit 114 via antenna sharing device 112. Receiving circuit 113 performs receiving operation of radio signals in a predetermined channel assigned for the wireless telephone, whereas transmitting circuit 114 performs transmitting operation of radio signals in a predetermined channel assigned for the wireless telephone.

Receiving circuit 113 and transmitting circuit 114 are connected with data processing portion 115. Data processing portion 115 performs such data processing operations of the received data as decoding of the received data by receiving circuit 113, separating of individual datum from the decoded data, and so on. As processing operation of the data to be transmitted, data processing portion 115 performs such data processing operation as blocking of the data to be transmitted, encoding of the blocked data, and so on. The processed data is then supplied to transmitting circuit 114.

Data processing portion 115 is connected with sound processing portion 116 for processing sound data for voice communication. Sound processing portion 116 is connected with speaker 117 and microphone 118 as means of the voice communication. Sound processing portion 116 is supplied with sound data contained in the received data supplied to data processing portion 115. The sound data is then decoded, and converted into the analog sound signal, which is supplied to speaker 117 as an output. On the other hand, the sound signal outputted from microphone 118 is converted by sound processing portion 116 into the digital signal, and then encoded, such as compression coded, into sound data of a predetermined format, which is then supplied to data processing portion 115.

The processings in receiving circuit 113, transmitting circuit 114, data processing portion 115 and sound processing portion 116, which have been described heretofore, are executed under control of central processing unit (CPU) 120 which is a microprocessor controlling various operations of portable telephone terminal 100. CPU 120 is supplied with operation information of key 121 and jog dial 122 disposed in portable telephone terminal 100. Key 121 includes only a limited number of keypads from a set of keypads necessary as a telephone terminal, and these keypads are disposed in terminal 100. Further, CPU 120 controls display on display portion 130 constituted by a relatively small display panel.

Further, portable telephone terminal 100 according to the present embodiment includes short-distance transmitting/receiving circuit 123 of small transmission output capacity for short-distance communication up to a few meters for example, and antenna 124 connected with this transmitting/receiving circuit 123. Received data obtained at data processing portion 115 is processed for transmission by transmitting/receiving circuit 123 for radio transmission from antenna 124 in a predetermined band, and the signal received at antenna 124 is processed for receiving by transmitting/receiving circuit 123, whereas data received is supplied to data processing portion 115. The frequency band for the transmission and the reception performed by short-distance transmitting/receiving circuit 123 is the 2.4 GHz band of Blue Tooth, for example. The transmission and reception by this transmitting/receiving circuit 123 are also executed under the control of CPU 120.

Next, constitution of data inputting/outputting device 200 will be described. Data inputting/outputting device 200 includes short-distance transmitting/receiving circuit 212 of a small transmission output capacity for short-distance communication up to a few meters for example, and antenna 211 connected with this transmitting/receiving circuit 212. By using transmitting/receiving circuit 212 and antenna 211, short-distance, two-way radio communication "b" can be made with transmitting/receiving circuit 123 and antenna 124 in portable telephone terminal 100.

Transmitting/receiving circuit 212 is connected with data processing portion 213. Data processing portion 213 performs processing operation necessary for data received by transmitting/receiving circuit 212, and further, supplies data accumulated in data processing portion 213 for transmission, from data processing portion 213 to transmitting/receiving circuit 212 for radio transmission to portable telephone terminal 100. This short-distance radio communication "b" between portable telephone terminal 100 and data inputting/outputting device 200 is made for data obtained at data inputting/outputting device 200 to be sent from portable telephone terminal 100 to the wireless telephone link, and for data received from the wireless telephone channels by portable telephone terminal 100 to be forwarded to data inputting/outputting device 200. Further, the short-distance radio communication "b" can also be used for transmission of status data of portable telephone terminal 100 to the data inputting/outputting device 200. For example, data indicating if portable telephone terminal 100 is located in or out of the wireless telephone service area and data about remaining charge in a battery incorporated in terminal 100 can be transmitted.

Further, data inputting/outputting device 200 is provided with display portion 220 so that data obtained at data processing portion 213 can be displayed. For example, when character message data is received, the character message can be displayed. Further, when image data is received, the image (a still image or an animation) can also be displayed. Display portion 220 can be used in two display modes: One edge of the display portion is the upper edge in one mode whereas the opposite edge becomes the upper edge in the other mode. Setting status of the display portion of these modes will be described later.

Further, data inputting/outputting device 200 is provided with memory card insertion portion 214, so that received data and data inputted by the user can be stored in a memory card inserted in memory card insertion portion 214.

Processing operation performed in data inputting/outputting device 200 is executed under the control of central processing unit (CPU) 215 which is a microprocessor controlling various operations in data inputting/outputting device 200. CPU 215 is supplied with operation information of keyboard 216 disposed in data inputting/outputting device 200. Keyboard 216 disposed in the data inputting/outputting device 200 is provided with a relatively large number of keypads assigned to an alphabet for example.

Keyboard 216 is used for inputting a message to be transmitted. The inputted data can be displayed in display portion 220 for confirmation. If the confirmed data is to be transmitted, then a predetermined operation is performed in data inputting/outputting device 200, so that the data is sent to portable telephone terminal 100, and then data is transmitted from portable telephone terminal 100 to an intended destination identified by a predetermined telephone number via the wireless telephone channels. Therefore, it is possible to input the telephone number of the destination upon transmission and to perform transmitting operation on keyboard 216 of data inputting/outputting device 200.

Figure 2:
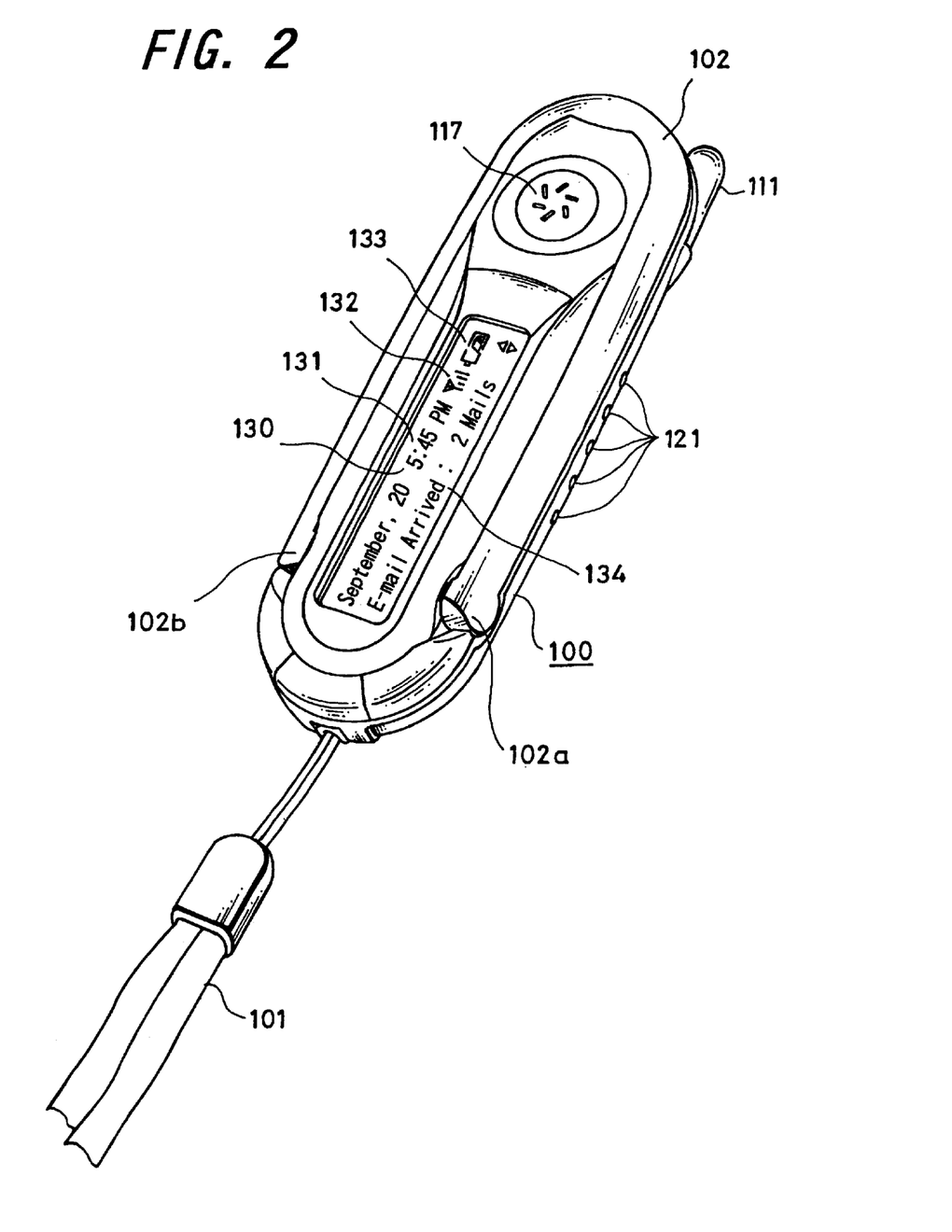
FIG. 2 is a perspective view showing an example of a telephone terminal device according to the first embodiment of the present invention.

FIG. 2 is a diagram showing an example of an outlook of portable telephone terminal 100 according to the present embodiment. portable telephone terminal 100 according the present embodiment is packaged in a very small housing having a length less than 10 cm for example. According to this example, oblong display portion 130 is disposed in a center portion of an upper surface, and speaker 117 for the voice communication is disposed thereabove. Further, antenna 111 is disposed at the upper end and several key pads 121 are disposed on a side portion. According to FIG. 2, portable telephone terminal 100 is provided with strap 101.

Display portion 130 shows only simple display relevant to selected functions out of many displays necessary in the radio telephoning. Specifically, according to the example in FIG. 2 for example, the display includes a display of current day and time 131, level display 132 of a plurality of levels indicating if portable telephone terminal is within the wireless telephone service area, charge level display 133 of the battery incorporated in portable telephone terminal 100, and arrival indication display 134 of a mail and so on.

Figure 3:
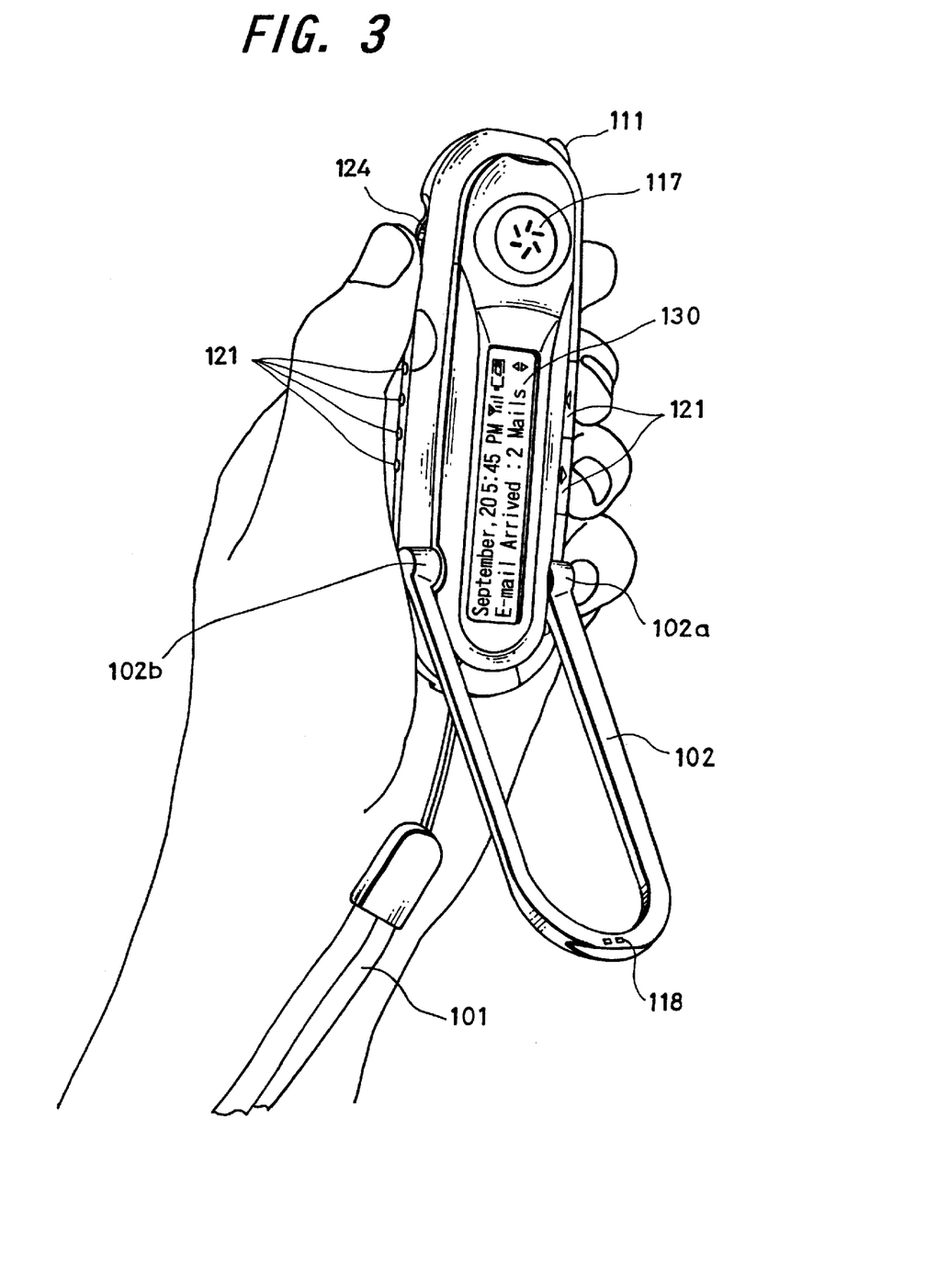
FIG. 3 is a perspective view showing an example of a state in which a microphone of the terminal device in FIG. 2 is opened.

Further, according to the example shown in FIG. 2, the microphone is foldable, i.e. arm 102 which is pivotable around pivot fulcrum 102a is attached. As shown in FIG. 3, when arm 102 is pivoted out, the microphone 118 attached in a tip portion thereof comes at the farthest location from speaker 117. As shown in FIG. 3, by pivoting out arm 102, voice communication can be performed by using microphone 118 and speaker 117.

It should be noted here that according to this example, some of the key pads disposed as key pads 121 becomes exposed and operable when arm 102 is pivoted out as shown in FIG. 3. Further, according to this example, portable telephone terminal 100 is not provided with keypads corresponding to numbers 0 to 9 and other symbols for inputting a telephone number. The inputting of a telephone number can be made for example, by operating jog dial 124. Further, dialing to a telephone number which is registered in a telephone number directory function, dialing to a telephone number based on a transmission/reception history and so on can be made simply by displaying the corresponding telephone number operating jog dial 124.

Figure 4:
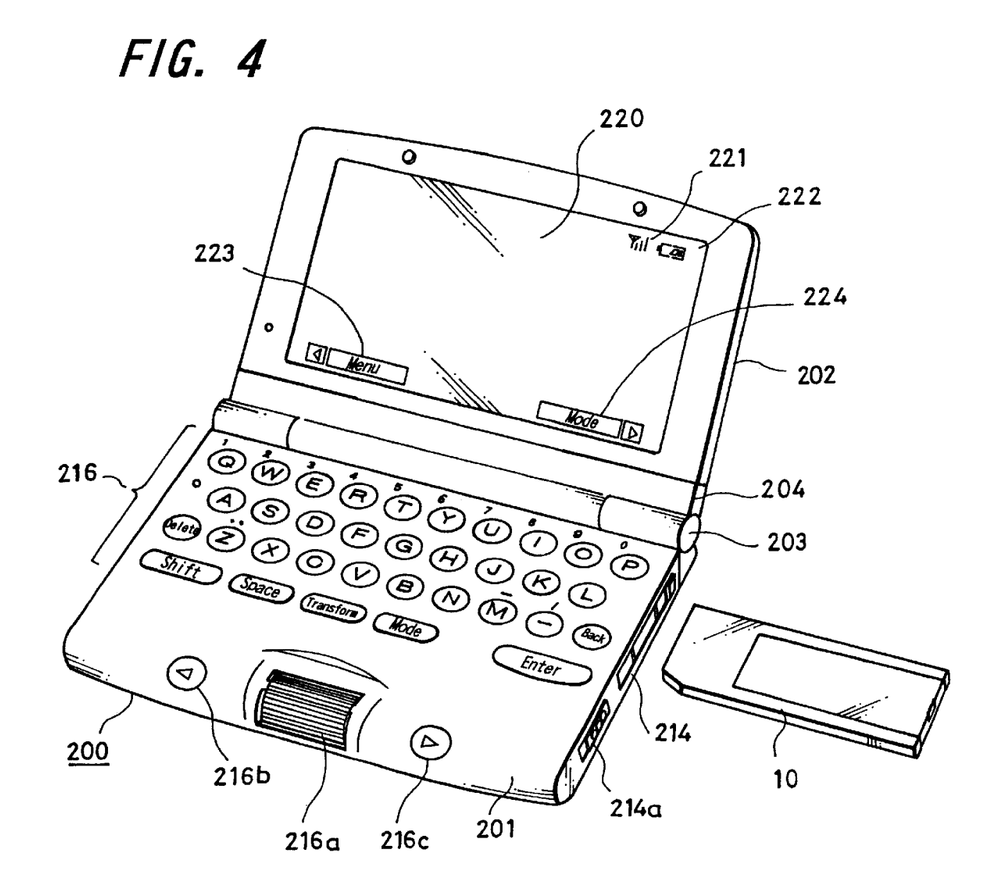
FIG. 4 is a perspective view showing a data inputting/outputting device according to the first embodiment of the present invention.

FIG. 4 shows an example of an outlook of data inputting/outputting device 200 according to this embodiment. Data inputting/outputting device 200 according to the present embodiment is packaged into a relatively small housing, having a length slightly longer than 10 cm, a width of a few cm, and a thickness of 1 cm for example. Data inputting/outputting device 200 according to the present example includes first member 201 and second member 202 connected pivotably with each other by a pivoting mechanism 203. First member 201 has a surface provided with keyboard 216 including a plurality of keypads assigned to an alphabet, numbers and various functions. Further, a front edge portion is provided with dial key 216a and two keys 216b, 216c indicating the left and the right directions respectively.

Further, first member 201 has a side surface provided with an opening for memory card insertion portion 214 for inserting and fitting of memory card 10 of a predetermined standard. Memory card 10 suitably used for the present example is a stick type (an oblong plate type) memory card for example.

Second member 202 has a surface provided with display portion 220 constituted by a display panel having an area occupying most of the surface. Display portion 220 can display character data and an image. In addition, level indication 221 showing whether or not portable telephone terminal 100 is within the service area, and battery charge level indication 222 of portable telephone terminal 100 can be displayed in an edge portion of the screen. Further, display 223 prompting to a key operation for opening a menu screen, and display 224 prompting to a key operation for opening a mode selection screen are displayed.

Figure 5:
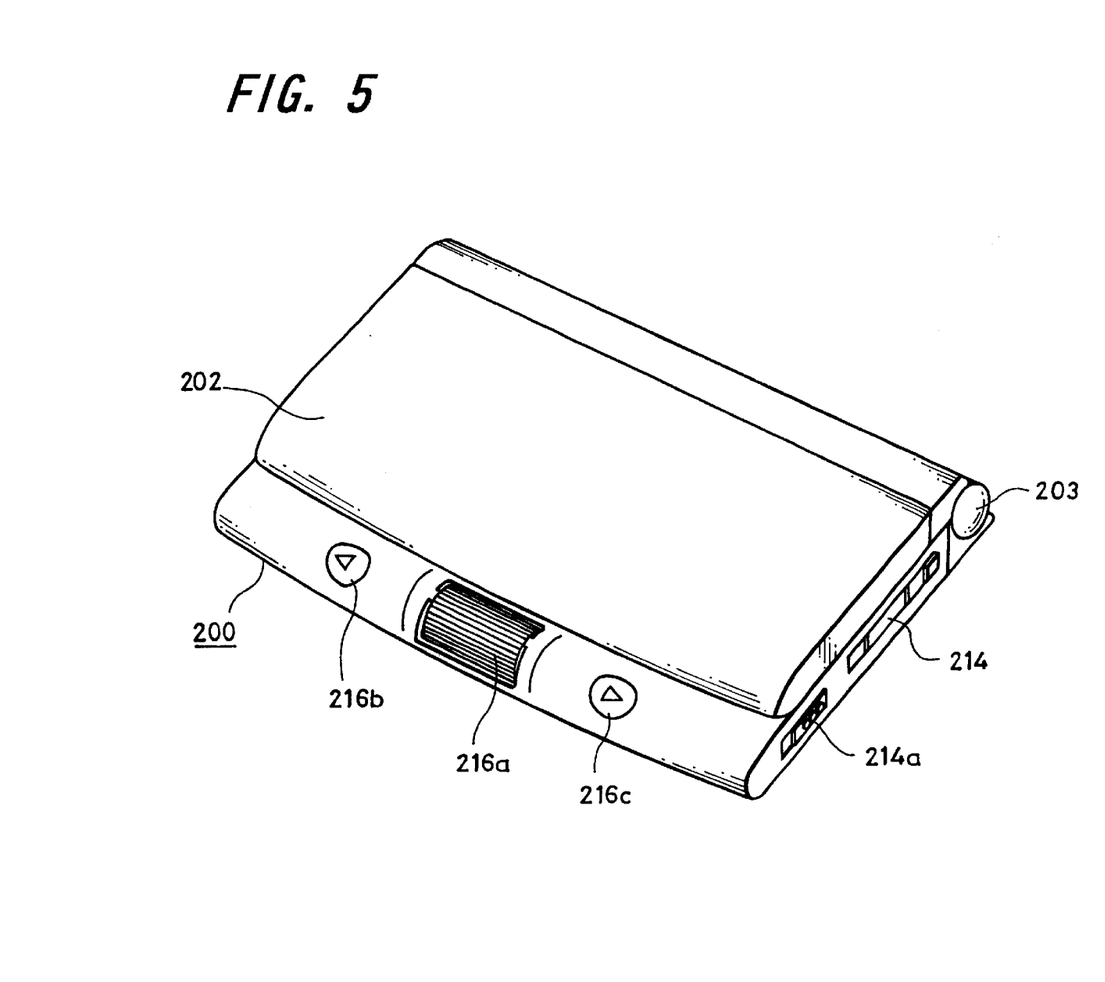
FIG. 5 is a perspective view showing a state in which the data inputting/outputting device in FIG. 4 is closed.

Further, second member 202 provided with display portion 220 has base portion 204 directly attached to pivoting mechanism 203, and therefore can be rotated by angle of 180 degrees so that an upper surface can be turned around to become a back surface. Specifically, in data inputting/outputting device 200 according to the present embodiment, pivoting mechanism 203 allows the two members to make the smallest angle, thereby closing first member 201 and second member 202, so that second member 202 serves as lid to cover keyboard 216, as shown in FIG. 5 for example. At this time, dial key 216a and two keys 216b, 216c disposed in the front edge portion are not covered by second member 202 and are exposed. This state shown in FIG. 5 is a normal closed state.

Figure 6:
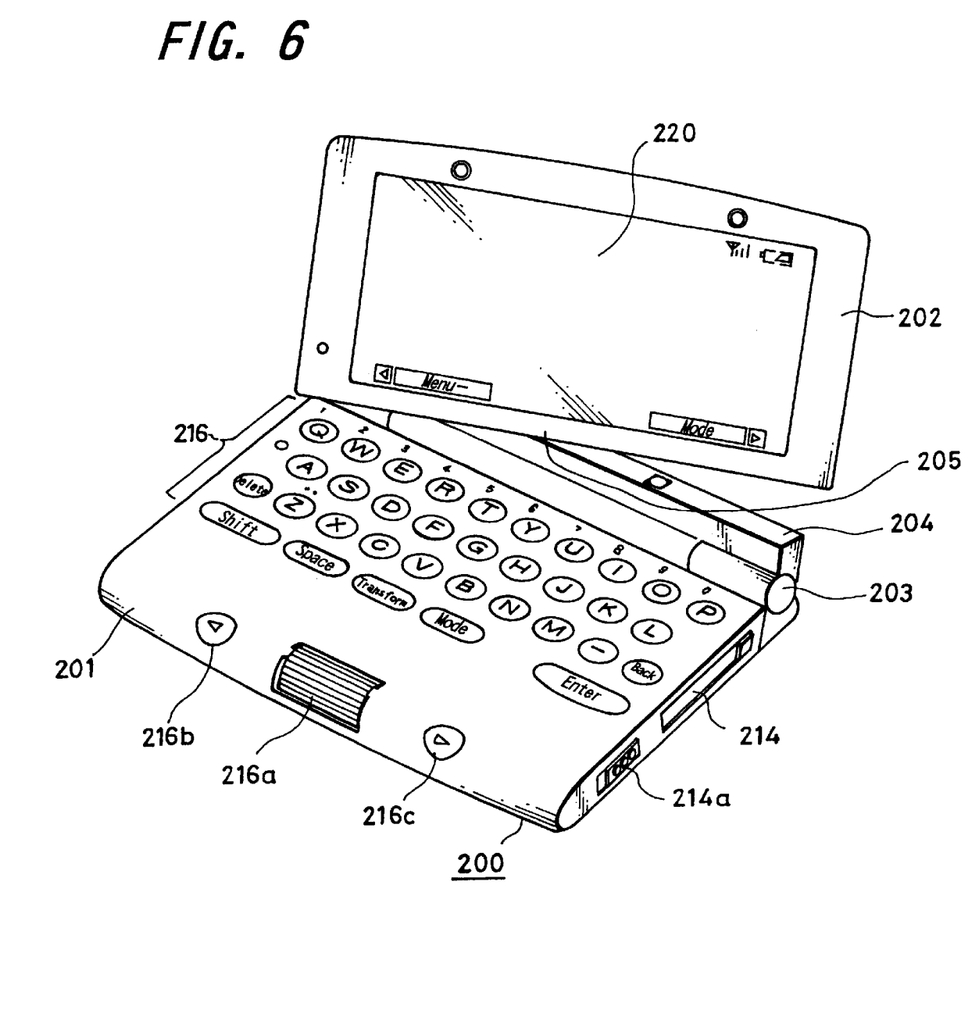
FIG. 6 is a perspective view showing a state in which a display portion of the data inputting/outputting device in FIG. 4 is pivoted.

Further, first member 201 and second member 202 can be pivoted to make a greater angle, and then second member 202 can be rotated at angle of 180 degrees around the center portion as a fulcrum between second member 202 and base portion 204 to turn display portion 220 around as shown in FIG. 6. Under this state, the two members can be pivoted to make the smallest angle by pivoting mechanism 203, thereby closing first member 201 and second member 202, so that second member 202 serves as the lid to cover keyboard 216, with the display panel constituting display portion 220 exposed to the outside as shown in FIG. 7 for example.

It should be noted that if display portion 220 is turned over as described above, the display made in display portion 220 is made upside down. This inversion is performed for example by CPU 215 supplied with information from a detecting mechanism detecting the state of second member 202 (normal or reversed) at base portion 204.

Figure 7:
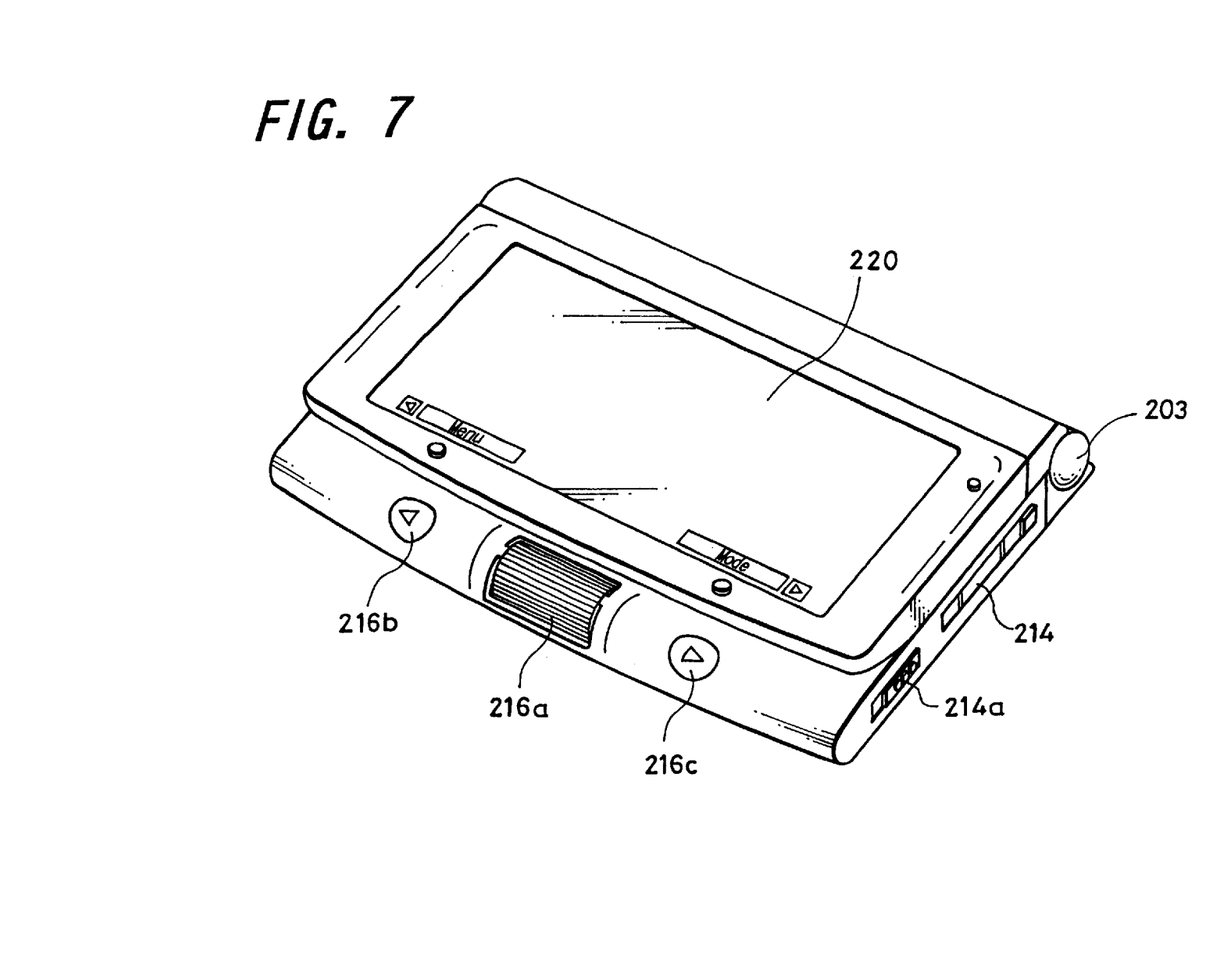
FIG. 7 is a perspective view showing a state in which the data inputting/outputting device in FIG. 4 is closed (with the display portion turned over)

The state shown in FIG. 7 allows the user to see display on display portion 220 in the closed state. Further, the user can perform simple operations since dial key 216a and two keys 216b, 216c in the front edge portion are exposed.

The device according to the present example, comprising the two housings, one including portable telephone terminal 100 for voice communication and the other including data inputting/outputting device 200 for display and input, provides convenience in that telephone conversation can be made only by using very small portable telephone terminal 100. In this case, although there are no dialing keys provided in portable telephone terminal 100, dialing operation can be made very simply by using the jog dial and so on resistering frequently used telephone numbers and so on in the telephone directory function. Inputting operation of a telephone number and so on can be made by using data inputting/outputting device 200. That is, a user inputs information such as a telephone number from keyboard 216 in data inputting/outputting device 200, and then data processing such as modulation, which is necessary for the transmission via Blue Tooth, is performed in data processing portion 213 and transmitting/receiving portion 212. The processed input information is then transmitted via antenna 211 to telephone terminal 100. The input information transmitted to telephone terminal 100 is received by antenna 124. The received information is then inputted to transmitting/receiving portion 123, processed for demodulation etc. and the demodulated information is stored in the telephone directory function area and so on in memory 125 via CPU 120. Resistration of information such as telephone numbers is thus completed.

Further, in order to read a character message received and to input a character message to send, data inputting/outputting device 200 can be used conveniently because the relatively large display panel and the keyboard allow efficient data inputting and confirmation.

Further, according to the present invention, since portable telephone terminal 100 and data inputting/outputting device 200 are linked with each other by the short distance radio transmission, there is no need for signal lines etc. to connect the two components, leading to a convenience.

Figure 8:
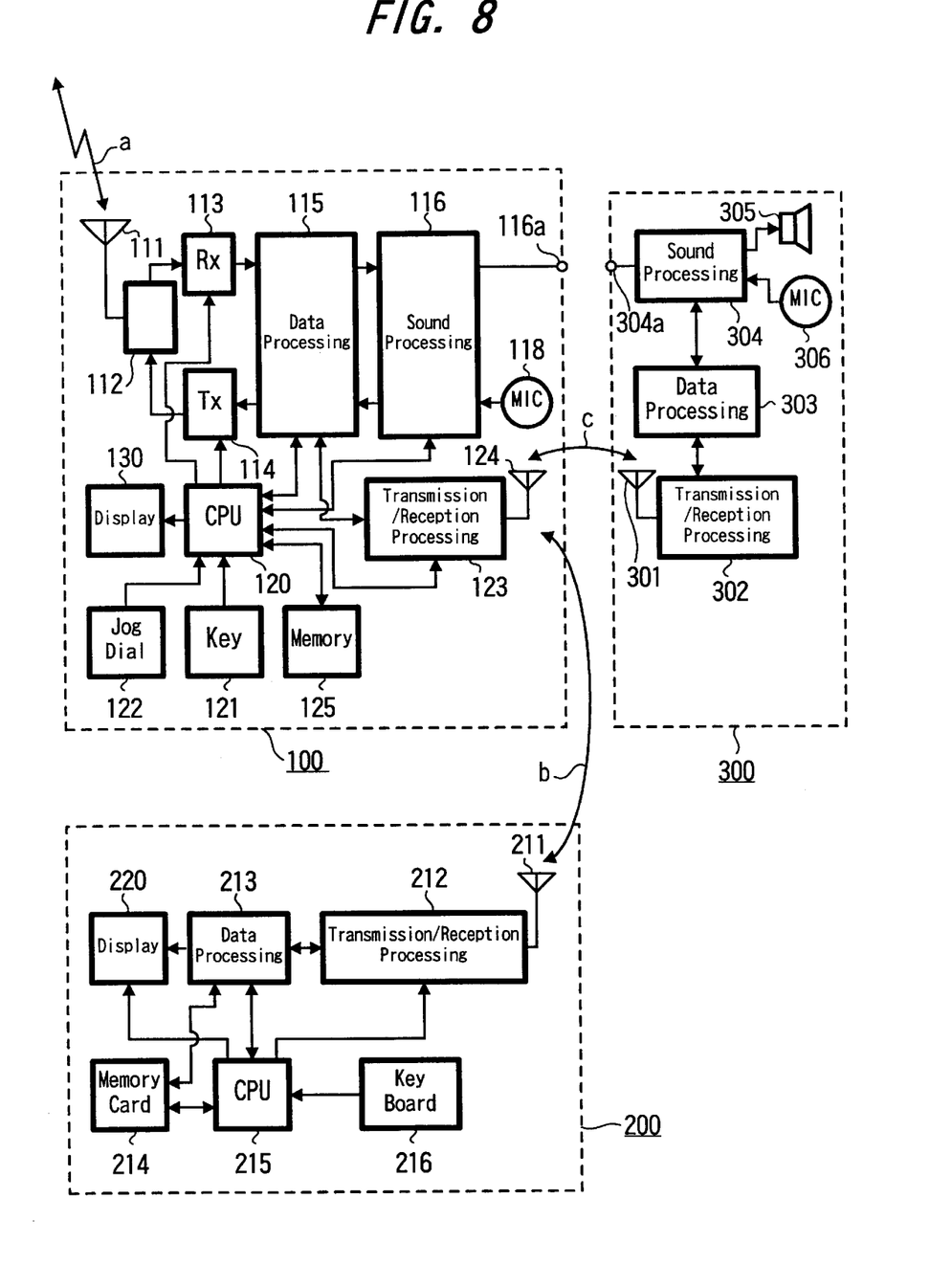
FIG. 8 is a block diagram showing a constitution according to a second embodiment of the present invention.
Figure 9:
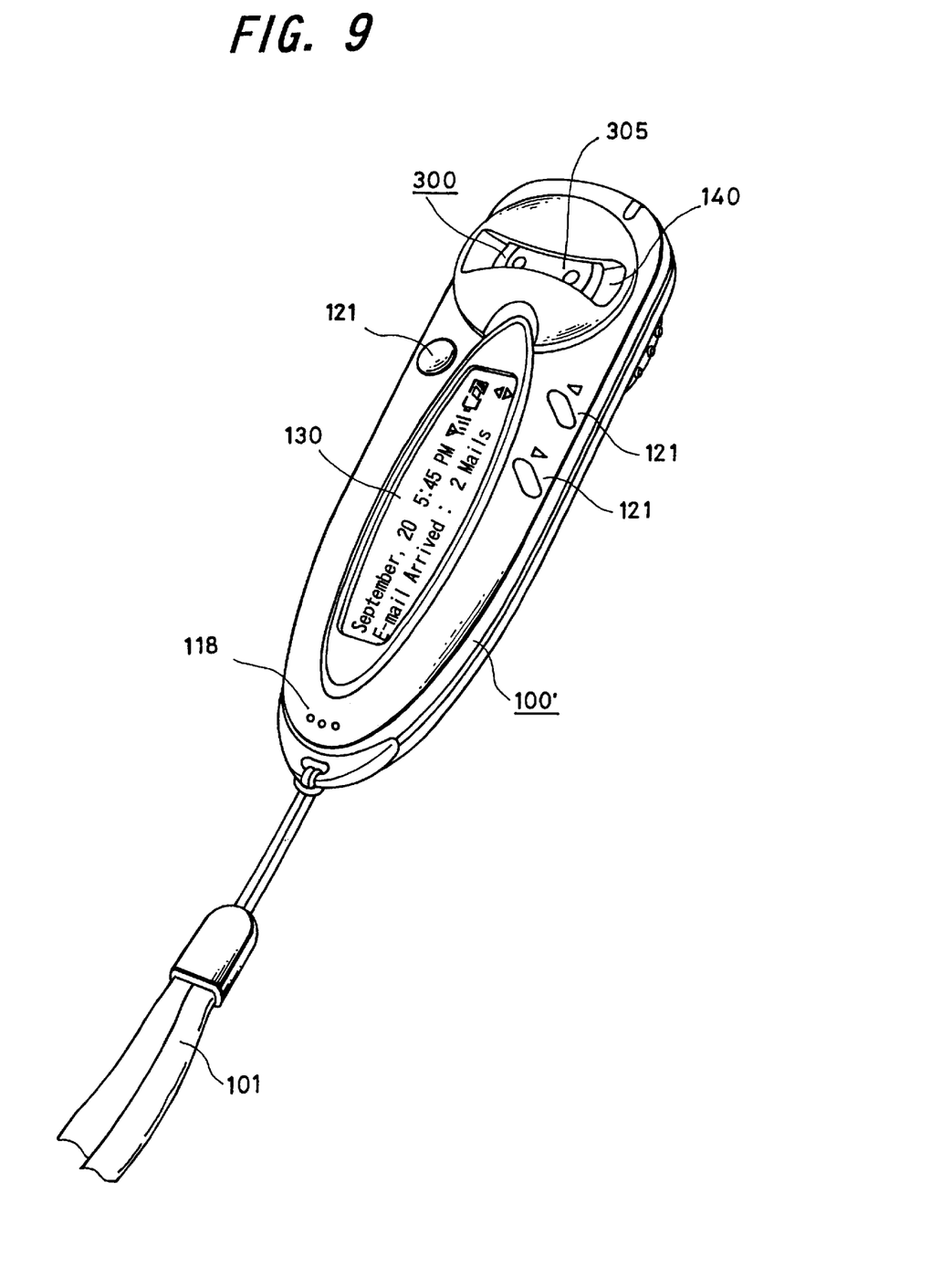
FIG. 9 is a perspective view showing an example of a telephone terminal device according to the second embodiment of the present invention.
Figure 10:
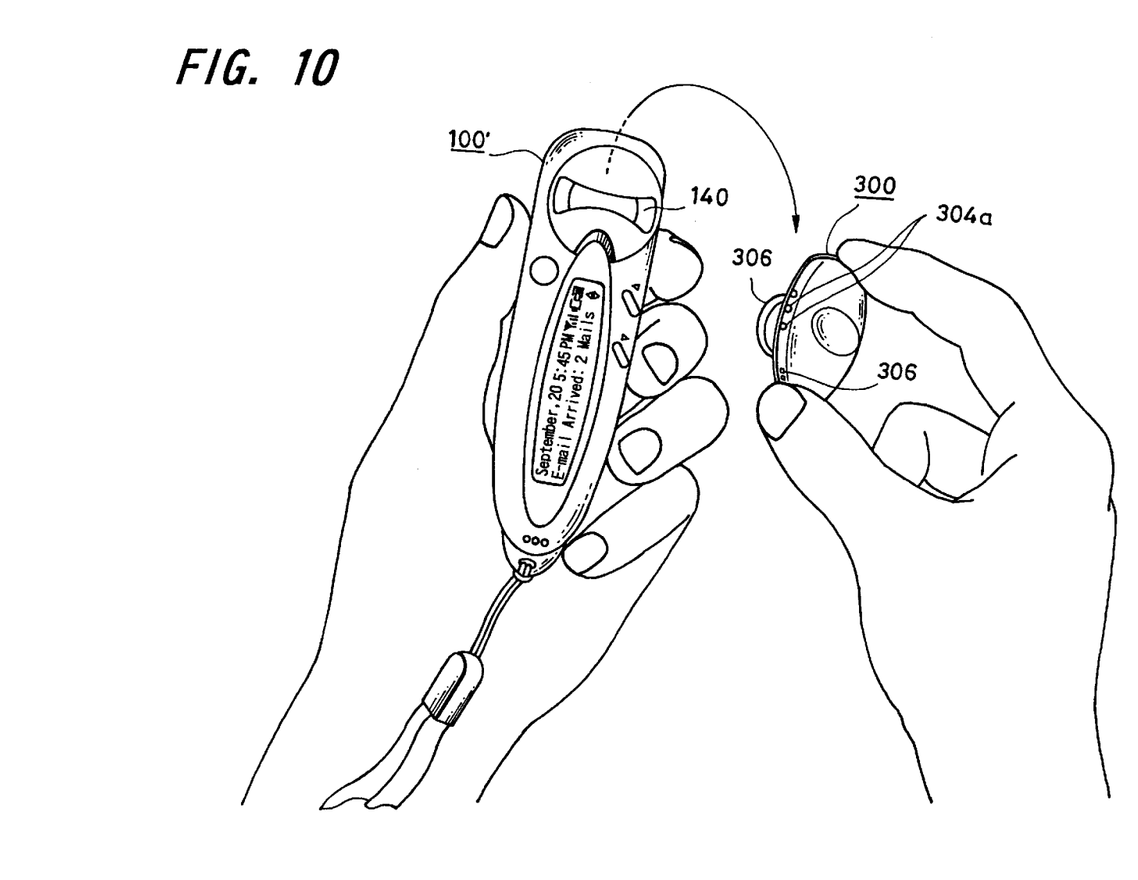
FIG. 10 is a perspective view showing an example of a state in which an ear piece of the terminal device in FIG. 9 is detached.

Next, a second embodiment of the present invention will be described with reference to FIGS. 8 to 10. In FIGS. 8 to 10, elements corresponding to those in FIGS. 1 to 7 described in the first embodiment will be indicated by the same alpha-numerals without description in detail.

According to the present embodiment, as in the first embodiment, the present invention is applied to wireless telephone device (portable telephone terminal) in which voice communication and data communication are performed by wirelessly exchanging digital data of a predetermined format with a station. According to the present embodiment, a unit of the communication terminal device is constituted by a pair of housings, namely portable telephone terminal 100' for performing radio communication with the station (or another authorized terminal device of the same kind), and data inputting/outputting device 200 for performing data input and output operation.

Further, according to the present embodiment, the speaker portion of portable telephone terminal 100' can be detached from a main body of the terminal and used as ear piece 300 as needed.

FIG. 8 is a block diagram showing a constitution of the present embodiment. Portable telephone terminal 100' includes microphone 118 as means for voice communication, but does not include a speaker. Sound processing portion 116 is connected with a terminal 116a for transmitting sound signals to ear piece 300. Other circuit constitution is identical with that of portable telephone terminal 100 shown in FIG. 1.

Portable telephone terminal 100' has an upper portion formed with a place to be fitted by ear piece 300. Ear piece 300 is provided with terminal 304a to be connected with the terminal 116a of portable telephone terminal 100'. Terminal 304a is connected with sound processing portion 304. Sound processing portion 304 is connected with speaker 305 and microphone 306. Microphone 306 is of a type capable of picking up the user's voice near an ear of the user.

When ear piece 300 is fitted into the upper portion of portable telephone terminal 100', sound processing portion 116 of portable telephone terminal 100' and sound processing portion 304 of ear piece 300 are directly connected with each other via terminals 116a, 304a. Then, if voice communication is made under this state, the conversation is made by using speaker 305 in ear piece 300 and microphone 118 incorporated in portable telephone terminal 100'. In other words, microphone 306 in ear piece 300 is not used.

Further, ear piece 300 includes short-distance transmitting/receiving circuit 302 of a small transmission output capacity for short-distance communication up to a few meters for example, antenna 301 connected with this transmitting/receiving circuit 302, and data processing portion 303 for processing data received by transmitting/receiving circuit 302 and data to be transmitted thereby. Transmitting/receiving circuit 302 and the antenna 301 perform radio communication "c"with transmitting/receiving circuit 123 and antenna 124 of portable telephone terminal 100'. Data processing portion 303 is connected with sound processing portion 304 of ear piece 300. Through the radio communication "c" between ear piece 300 detached from portable telephone terminal 100' and portable telephone terminal 100', the user can make a telephone dialogue only by using ear piece 300.

FIG. 9 is a diagram showing an example of an outlook of portable telephone terminal 100' according to the present embodiment. Portable telephone terminal 100' according to the present embodiment is packaged in a very small housing having a length less than 10 cm for example. According to this example, oblong display portion 130 is disposed in a center portion of an upper surface, and speaker 117 for voice communication is disposed thereabove. Further, antenna 111 is disposed at the upper end and several key pads 121 are disposed on a side portion. According to FIG. 9, portable telephone terminal 100 is provided with a strap 101.

Further, an upper portion is provided with attaching portion 140 for attaching ear piece 300. When ear piece 300 is attached to attaching portion 140 from a backside of terminal 100', the speaker 305 in ear piece 300 is exposed so as to function as a speaker of portable telephone terminal 100' for voice communication.

FIG. 10 is a diagram showing a state in which ear piece 300 is detached from portable telephone terminal 100'. Part of ear piece 300 provided with speaker 305 is formed to fit in a ear so that the user can wear, and has a side surface provided with microphone 306. By detaching ear piece 300 from portable telephone terminal 100' and fitting into ear of the user, voice communication becomes possible by using ear piece 300 only.

Data inputting/outputting device 200, which is not described in particular for this embodiment, is the same as data inputting/outputting device 200 described for the first embodiment.

As has been exemplified above, by using the terminal device according to the present embodiment, voice communication is possible as a normal portable telephone terminal, with the ear piece attached to portable telephone terminal, and in addition, if the ear piece is detached, the user can make the voice communication very conveniently by only wearing the ear piece. (Portable telephone terminal 100' must stay close to the user, however.) It should be noted here that the ear piece may be provided with keypads for selected functions.

Further, according to the second embodiment, the terminal device comprises portable telephone terminal 100' and data inputting/outputting device 200 and the ear piece is detachable from the terminal main body 100'. Alternatively, a normal portable telephone terminal not paired with data inputting/outputting device 200 may have its speaker portion as a detachable ear piece.

Further, according to the first and the second embodiments described above, the communication terminal is portable telephone terminal which uses radio telephone channels. However, the present invention is also applicable to terminal devices using other communication links.

According to the present invention, voice communication can be performed by using the communication means provided in the first housing. Further, when transmitting such data as a character message and image data, the display means provided in the second housing can be used for displaying received data, and the inputting means provided in the second housing can be used for inputting necessary data. Therefore, the first housing can be provided with only minimum necessary functions for the communication. For example, there is no need to provide the dial key or a large display panel, and therefore the first housing can be made very small suitable for carrying. Further, by using the second housing, received character message and image can be displayed on the relatively large display panel. In addition, inputting of a message to be transmitted can be made relatively easily, with an improved operability. In this case, there is no need for a signal wire and the like because the first housing and the second housing are wirelessly connected.

With the above described arrangement, further, between the region where the display means is disposed and the region where the input means is disposed in the second housing, the angle adjusting mechanism capable of variably changing an angle between the two means is provided. Further, the inverting mechanism capable of turning the display means by the angle of 180 degrees is provided. These make possible to use the second housing in many different ways.

Further, with the above described arrangement in the second housing, when the angle between the display means and the input means is made the smallest, most of the input means are covered by the region where the display means is disposed. However, part of the input means are not covered and left exposed. These make possible to perform simple operations by using the display means and the exposed portion of the input means, with received data and so on visible on the display.

Still further, the display means of the second housing is arranged to display radio communication status of the first radio communication means and data processing status of the first data processing means in the first housing. This makes possible that the user can check if the communication service is available and if there is enough charge left in the battery simply from the display on the display means in the second housing.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication terminal device comprising:
    a portable communication terminal portion including
    first radio communication means for radio communication with one of a predetermined station and another terminal,
    first data processing means for processing one of data received and data to be transmitted by the first radio communication means,
    second radio communication means connected with the first data processing means for short-distance radio communication, and
    voice communication means connected with the first data processing means for processing voice communication; and
    an information processing portion including
    third radio communication means for short-distance radio communication with the second radio communication means in che portable communication terminal portion,
    second data processing means connected with the third radio communication means for processing one of data received and data to be transmitted,
    input means for inputting data to the second data processing means,
    display means for displaying data processed by the second data processing means,
    an angle adjusting mechanism for variably setting an angle between the display means and the input means about a first axis, and
    an inverting mechanism for turning a disposition of the display means through an angle of 180 degrees about a second axis that is substantially perpendicular to the first axis.

2. The communication terminal device according to claim 1, wherein a substantial portion of the input means is covered by the display means when the angle between the display means and the input means is at a predetermined minimum angle, and a portion of the input means remains exposed at the predetermined minimum angle.

3. The communication terminal device according to claim 1, wherein the display means displays one of a radio communication status of the first radio communication means and a processing status of the first data processing means.

4. The communication terminal device according to claim 1, wherein the short-distance radio communication between the second radio communication means and the third radio communication means is made using Blue Tooth.

5. The communication terminal device according to claim 1, wherein the portable communication terminal portion further includes data display means for displaying a status of a predetermined function.

6. The communication terminal device according to claim 1, wherein the display means in the data processing portion displays a status of the portable communication terminal portion.

7. The communication terminal device according to claim 1, wherein the portable communication terminal portion further includes memory means for storage of data, wherein information inputted via the input means of the data processing portion is stored in the memory means via the third radio communication means and the second radio communication means.

* * * * *